(12) United States Patent
Maifeld et al.

(10) Patent No.: US 10,872,312 B2
(45) Date of Patent: Dec. 22, 2020

(54) CUSTOMER ORDER PICKING BY DELIVERY CONTAINER

(71) Applicant: ORACLE INTERNATIONAL CORPORATION, Redwood Shores, CA (US)

(72) Inventors: Rebecca Maifeld, Brooklyn Park, MN (US); Steven Gooijer, Maple Grove, MN (US); Brian Voelz, Minnetonka, MN (US)

(73) Assignee: Oracle International Corporation, Redwood Shores, CA (US)

(*) Notice: Subject to any disclaimer, the term of this patent is extended or adjusted under 35 U.S.C. 154(b) by 890 days.

(21) Appl. No.: 14/698,015

(22) Filed: Apr. 28, 2015

(65) Prior Publication Data

US 2016/0321605 A1    Nov. 3, 2016

(51) Int. Cl.
*G06Q 10/08* (2012.01)
*G06Q 30/06* (2012.01)

(52) U.S. Cl.
CPC ..... *G06Q 10/0875* (2013.01); *G06Q 30/0635* (2013.01)

(58) Field of Classification Search
None
See application file for complete search history.

(56) References Cited

U.S. PATENT DOCUMENTS

| | | | | |
|---|---|---|---|---|
| 6,505,093 B1 * | 1/2003 | Thatcher | ............. | B65G 1/1376 700/214 |
| 7,139,637 B1 * | 11/2006 | Waddington | ........... | G06Q 10/04 700/216 |
| 7,263,498 B1 * | 8/2007 | Van Horn | ............ | G06Q 10/087 705/26.81 |
| 7,979,359 B1 * | 7/2011 | Young | .................... | G06Q 10/06 705/332 |
| 8,504,413 B1 * | 8/2013 | Rowe | ..................... | G06Q 10/08 705/26.2 |
| 8,571,700 B2 * | 10/2013 | Keller | .................... | B25J 9/1687 700/213 |
| 10,442,622 B2 * | 10/2019 | Lert | ........................ | B65G 1/045 |
| 2002/0178074 A1 * | 11/2002 | Bloom | .................. | G06Q 10/08 705/26.81 |
| 2005/0216518 A1 * | 9/2005 | Hu | ....................... | G06F 16/2237 |

(Continued)

*Primary Examiner* — Peter Ludwig
(74) *Attorney, Agent, or Firm* — Kraguljac Law Group, LLC

(57) ABSTRACT

Systems, methods, and other embodiments associated with identifying and generating pick lists for ordered items in delivery containers with mixed non-delineated inventory are described. In one embodiment, a method includes identifying whether a container includes ordered items that are mixed with items for a general inventory of a retail store. The container is a delivery container provided from a warehouse to supply the retail store. The ordered items are items for fulfilling one or more of a plurality of customer orders. The example method may also include generating an electronic pick list for the container in response to identifying that the container includes the ordered items. The electronic pick list identifies the ordered items in the container and causes the ordered items to be diverted from the general inventory of the retail store when the container is unpacked.

19 Claims, 3 Drawing Sheets

(56) References Cited

U.S. PATENT DOCUMENTS

2007/0168257 A1* 7/2007 Sakuma ............... G06Q 20/203
  705/22
2007/0214065 A1* 9/2007 Kahlon ................ G06Q 10/087
  705/28
2018/0012174 A1* 1/2018 Srivastava ........... G06Q 10/087

* cited by examiner

CUSTOMER ORDER PICKING BY DELIVERY CONTAINER

BACKGROUND

Warehouse deliveries to a retail store or other fulfillment location generally include containers that are each packed with many items. In some circumstances, a container may include a mixed inventory of items. That is, the container may include reserved items that are reserved for specific customer orders and also items for a general inventory of the retail store. Thus, difficulties arise when unpacking the container because the reserved items are mixed with the general inventory items without any marking or other delineation to indicate the reserved items are present.

Consequently, the reserved items may get distributed into the general inventory and out onto a showroom floor of the retail store even though the reserved items are intended for specific customer orders. Additionally, allowing the reserved items to be distributed to the general inventory causes inefficiencies with handling the reserved items multiple times that may lead to the reserved items being unintentionally sold from the showroom floor.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
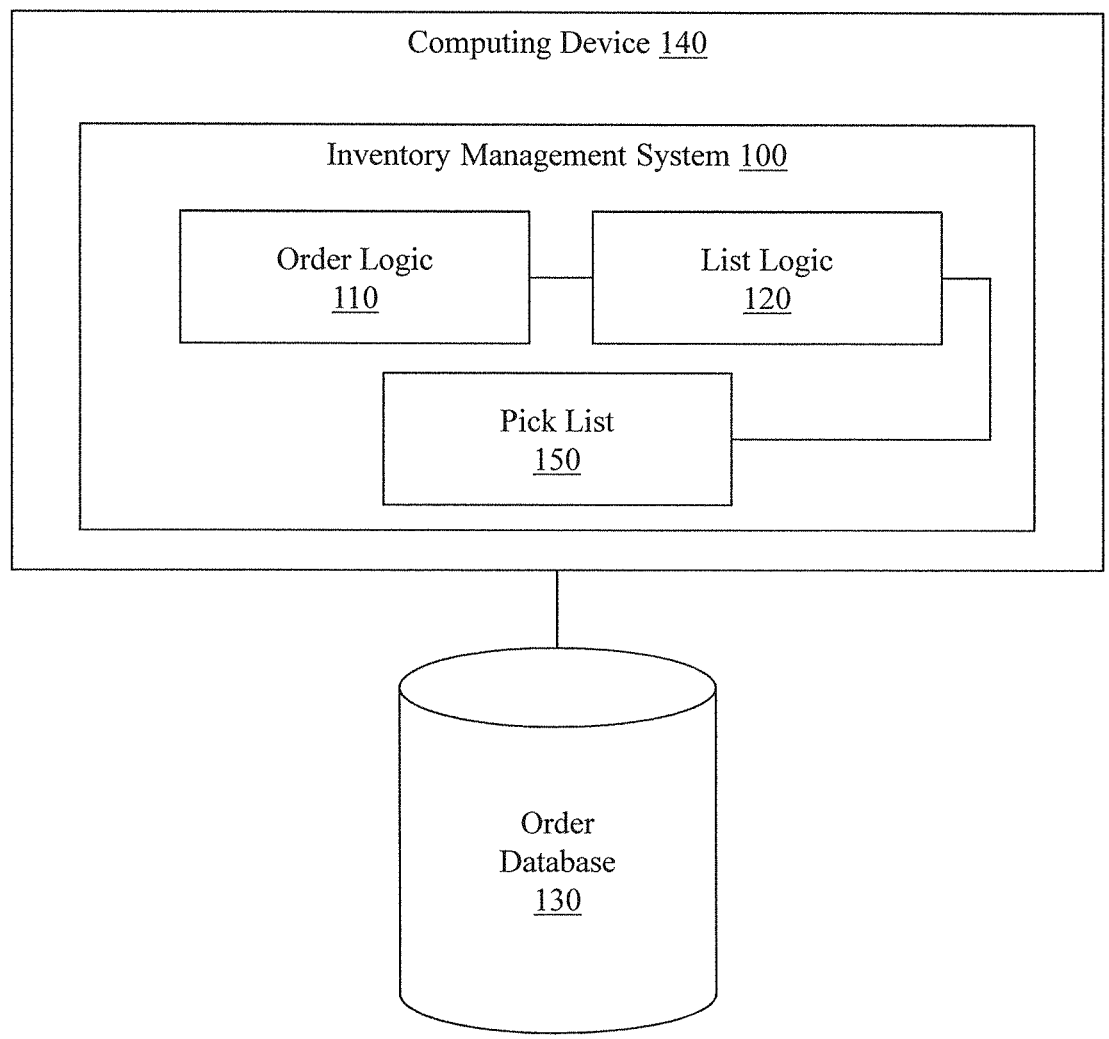
FIG. 1 illustrates one embodiment of a system associated with picking items from delivery containers to fulfill customer orders.

Computerized systems and methods are described herein associated with generating electronic pick lists for individual delivery containers. In one embodiment, information associated with delivery containers is analyzed prior to unpacking and distributing items from the container. Based on the analysis, reserved items that match ordered items from customer orders can be identified and separated from other general inventory items in the container (e.g., non-customer orders). The reserved items can be removed from the container and diverted from being placed in a general inventory of a retail store. Additionally, in another embodiment, general inventory items that match ordered items may also be identified and diverted from the general inventory to fulfill customer orders.

For example, customer orders are generated through an online web store for fulfillment and pickup at the retail store. In general, the customer orders are for items that are sold at the retail store and are part of the general inventory of the retail store. Thus, if an item is available within the general inventory of the retail store, then the item can be picked from the general inventory at the retail store to fulfill a customer order directly. However, if the item is not available in the general inventory of the retail store, then the item is provided to the retail store from a warehouse or supplier via a delivery container. In general, the delivery container is a pallet, truck, tractor trailer, shipping container or other delivery vessel that may include many (e.g., hundreds) of items. Because the retail store generally receives multiple and frequent deliveries from the warehouse/supplier, items for fulfilling customer orders can be included along with deliveries of other items for the general inventory in the delivery containers.

Consequently, containers may include a mixed assortment of items (e.g., reserved/pre-sold items and items for the general inventory). However, because the containers include no physical delineation or marking between the reserved items and items for the general inventory, workers unpacking the containers may unknowingly distribute reserved items to the general inventory of the retail store. Distributing the reserved items to the general inventory causes inefficiencies with handling items multiple times and difficulties with unintentionally selling the reserved items. Accordingly, in one embodiment, as containers are unpacked, a worker may electronically scan a container to identify whether the container includes any items for customer orders.

For example, a container is electronically selected for unpacking by scanning the container with a computerized handheld scanner or other device. Subsequently, a computerized inventory management system electronically analyzes information about the container to determine whether the container includes items that are reserved for customer orders or, in one embodiment, also whether items that match ordered items from outstanding customer orders. If the container includes items for customer orders (e.g., reserved items), then the computerized management system generates an electronic pick list for the items and electronically provides the pick list to a worker that is unpacking the container. In this way, ordered items for customer orders can be identified on a per container basis and distinguished from general inventory items. Thus, items for customer orders can be diverted from the general inventory of the retail store.

With reference to FIG. 1, one embodiment of an inventory management system 100 associated with per container order picking is illustrated. In general, the inventory management system 100 manages an inventory of a retail store. In one embodiment, the retail store is a physical retail location that shares an inventory with an electronic commerce source (e.g., a web store). Thus, the inventory is an in-store inventory of the retail store. Accordingly, the inventory may be on store shelves (in stock) and available to customers at the retail store.

Furthermore, the inventory management system 100 tracks quantities and other information about items in the inventory. In one embodiment, the inventory management system 100 manages customer orders for items that are received from an online source, in store reservation, and so on. Additionally, the inventory management system 100 also manages deliveries of items in containers for addition to the inventory.

In one embodiment, the inventory management system 100 is a computing/data processing system including an application or collection of distributed applications for enterprise organizations that are executable by a computing device (e.g., computing device 140) using at least a processor and memory. The inventory management system 100 may be configured to operate with or be implemented as a cloud-based networking system, software as a service (SaaS) architecture, or other type of networked computing solution or data processing system. In one embodiment, the inventory management system 100 is a centralized server-side application that is accessed by many users via computing devices/terminals communicating with the system 100 over a network.

In one embodiment, the inventory management system 100 includes order logic 110 and list logic 120 that together process information about customer orders and delivered containers to identify when a container includes ordered items for customer orders. Furthermore, the inventory management system 100 may store and retrieve item and customer order information from an electronic database such as order database 130. Additionally, the inventory management system 100 may be implemented in a computing device 140. For example, the inventory management system 100 may be implemented in program modules stored in a memory of the computing device 140. The computing device 140 may be a computer or similar device with which a worker (i.e., user) can interact in order to manipulate and view information about delivered containers and items in the inventory of the retail store.

In one embodiment, the order logic 110 is configured to electronically identify whether a container includes ordered items for fulfilling customer orders. Thus, the order logic 110 is, for example, a program module stored in a memory of the computing device 140 and is configured to receive information about containers and electronically analyze the information to identify whether a container includes reserved items or, in one embodiment, matching items for customer orders.

Additionally, the list logic 120 is configured to electronically generate a pick list 150 for the reserved/matching items when present in a delivered container. Thus, in one embodiment, the list logic 120 is a program module stored in a memory of the computing device 140 and is configured to process customer orders and container information to generate and provide electronic pick lists.

For example, suppose that a customer interacts with a web store associated with the retail store and initiates a purchase of multiple items. From the purchase, the inventory management system 100 generates a customer order that indicates information such as ordered items, customer information and so on. Thereafter, the ordered items of the customer order should be picked (i.e., retrieved) from the inventory of the retail store according to an electronic pick request generated by the inventory management system 100. In this way, the customer order is provided to the retail store and can be picked up by the customer.

However, if the ordered items of the customer order are not available (i.e., not on shelves at the retail store or otherwise in-stock of the general inventory of the retail store), then the ordered items are obtained from a warehouse, supplier, or other location. Accordingly, the inventory management system 100 may electronically request the items from the warehouse/supplier if they are not presently in the general inventory of the retail store.

In either case, the warehouse provides containers of items to the retail store for fulfilling customer orders and to restock the general inventory of the retail store. Similarly, the supplier provides containers of items to the retail store for fulfilling customer orders, to restock the general inventory, or both. The containers are, for example, trucks, trailers, pallets, boxes or some other vessel for shipping a group of items. Thus, in general, containers delivered to the retail store will include a plurality of items that are used to restock the general inventory of the store. The containers typically are not reserved for particular customer orders. However, when the warehouse receives requests from the inventory management system 100 to send items for fulfilling customer orders, reserved items are packed in a container with items for the general inventory, but are not separated from the general inventory items. Consequently, containers may include a mixed non-delineated inventory.

Accordingly, the order logic 110 is configured to receive container attributes of a container that is delivered to the retail store. In general, the container attributes are electronically collected into a data structure when items for the container are gathered and packed together at the warehouse. In one embodiment, the order logic 110 receives the data structure of the container attributes from a network communication and stores the container attributes in the order database 130. The attributes may include, for example, shipping information, container information (e.g., size, physical specifications), item information (quantities and identifiers) for items in the container, and customer order information for items included in the container.

While the order database 130 is discussed as storing information regarding customer orders, of course, the order database 130 may be part of a larger database structure that includes additional inventory information. For example, in one embodiment, the order database 130 also includes records of the general inventory (e.g., physical items that are in the retail store or in a warehouse, products/materials in stock, etc.). Furthermore, the order database 130 may store information about different items in the inventory of the retail store. The information may include available inventory, reserved inventory, a status for each customer order, attributes of items and so on. Additionally, the items may be groceries (e.g., produce), electronics, clothing or any other consumer product.

Continuing with processing a delivered container, the order logic 110 is configured to identify whether the container includes items for fulfilling customer orders. In one embodiment, the order logic 110 is configured to identify not only if the container includes reserved/pre-sold items for specific customer orders, but also, for example, whether general inventory items in the container may be used to fulfill outstanding customer orders.

Thus, identifying whether the container includes ordered items will be discussed in two separate parts.

Reserved Items

In one embodiment, the order logic 110 is configured to identify whether the container includes items that are reserved or pre-sold items. For example, the reserved items are items specifically included in the container to fulfill a customer order for which the reserved items were requested from the warehouse. Thus, when the container is unpacked, the reserved items should not be distributed to the general inventory of the retail store or the showroom floor for sale to the general public.

Accordingly, to prevent the reserved items from being placed into general inventory, the order logic 110 is configured to electronically retrieve the attributes for the container from the order database 130. In one embodiment, the order logic 110 is initiated to retrieve the attributes upon the container being scanned by a handheld electronic device or in response to receiving some other electronic signal that indicates the container has arrived at the retail store and is to be unpacked.

Thereafter, the order logic 110 analyzes the attributes to identify whether the container includes the reserved items. In one embodiment, the order logic 110 analyzes the attributes by searching the attributes for information that specifies which items in the container are for customer orders. That is, the order logic 110, for example, compares items from customer orders to items in the container to identify matches between the items that indicate the presence of reserved items. In another embodiment, the order logic 110 is configured to check an indicator in the container attributes to determine if the container includes the reserved items. In general, the indicator may specify whether reserved items for customer orders are included in the container or not.

While specific examples of how the order logic 110 identifies the container as including reserved items are discussed, of course, an exact scheme for identifying whether the container includes reserved items may be dependent on a specific implementation. In either case, if the order logic 110 indicates that the container does not include reserved items, then unpacking the container and distributing the items into the general inventory occurs without specific instructions.

However, if the order logic 110 identifies the container as including reserved items, then the list logic 120 electronically generates the pick list 150 that identifies the reserved items. Generating the pick list 150 will be discussed in greater detail subsequently. Additionally, in one embodiment, the order logic 110 may also cause a sound to be played or initiate some other indication that the container includes reserved items.

Fulfilling Customer Orders from General Inventory in a Container

In one embodiment, the order logic 110 is configured to identify items in the container that are items initially intended for general inventory of the retail store to fulfill one or more customer orders separate from identifying whether reserved items are present in a container. That is, the order logic 110 may be configured to, for example, match items in the container that are items intended for the general inventory of the retail store with items from outstanding customer orders. For example, suppose that the inventory management system 100 has outstanding customer orders for which items have not yet arrived. In this example, when a container is delivered to the retail store even if the container does not include any specifically reserved items, the order logic 110 is configured to compare items from the outstanding customer orders with items in the container in order to match and "reserve" items for the outstanding customer orders.

Thus, in one embodiment, the order logic 110 is configured to retrieve information from the order database 130 about outstanding customer orders that have not yet been fulfilled. The order logic 110 may retrieve a list of items from the outstanding customer orders, a list of items for customer orders that are overdue, and so on. In either case, the order logic 110 compares the list of items retrieved from the order database 130 with items in the container. If the order logic 110 determines that items in the container match items on the list, then the order logic 110 indicates that matching items are present and reserves the matching items by changing, for example, a status of the matching items to reserved. It should be noted that the matching items are not the same as reserved items since the matching items were not originally included in the container at the warehouse with intentions of fulfilling a specific customer order. However, the order logic 110 dynamically assigns the matching items to customer orders according to analyzing items in the container versus items needed for outstanding customer orders.

As previously noted, the order logic 110 may generate some electronic indication that the container includes reserved items. Accordingly, when the order logic 110 identifies the matching items, the order logic 110 also generates the electronic indication/alert. The indication/alert may be a flashing light, beeping noise, a message on a display and so on. Additionally, in one embodiment, the order logic 110 also electronically alerts the list logic 120 to generate the pick list 150 (e.g., via a message or electronic signal).

Thus, in response to the alert signal, the list logic 120 generates the pick list 150 with the reserved items. That is, the list logic 120 generates the pick list with items that the order logic 110 identified as correlating with customer orders. In one embodiment, the list logic 120 generates the pick list 150 for reserved items that were pre-designated for particular customer orders separate from newly matched items that the order logic 110 matched after the container was received at the retail store. In either case, the list logic 120 electronically generates the pick list 150 with, for example, information for identifying each item that is to be allocated (e.g., assigned and placed aside from the general inventory) to fulfill a customer order and also with information about the customer order.

In one embodiment, the list logic 120 generates the pick list 150 as a data structure in a memory of the computing device 140 or as an electronic document (e.g., XML document, etc.) that is to be electronically rendered on a display of the computing device 140. In this way, the matched/reserved items can be diverted from being placed into the general inventory of the retail store to avoid inefficiencies with handling the items multiple times.

Furthermore, the list logic 120 is configured to validate the pick list 150 prior to providing the pick list 150 to a user/worker. For example, the list logic 120 is configured to determine whether customer orders associated with items on the pick list 150 have been cancelled or fulfilled using items from a separate container. In one embodiment, the list logic 120 validates the pick list 150 by checking status indicators in the order database 130 to ensure that items from other containers have not been used in place of the reserved/matched items from the current container and/or that a customer order has not otherwise been fulfilled or cancelled.

Once the list logic 120 electronically validates the pick list 150, the list logic 120 electronically provides the pick list 150 to a worker that is to unpack the container. In this way, the pick list causes items in the container to be allocated by being set aside and earmarked for particular customer orders. Accordingly, the ordered items are diverted from the general inventory and from being placed onto shelves of the retail store.

Figure 2:
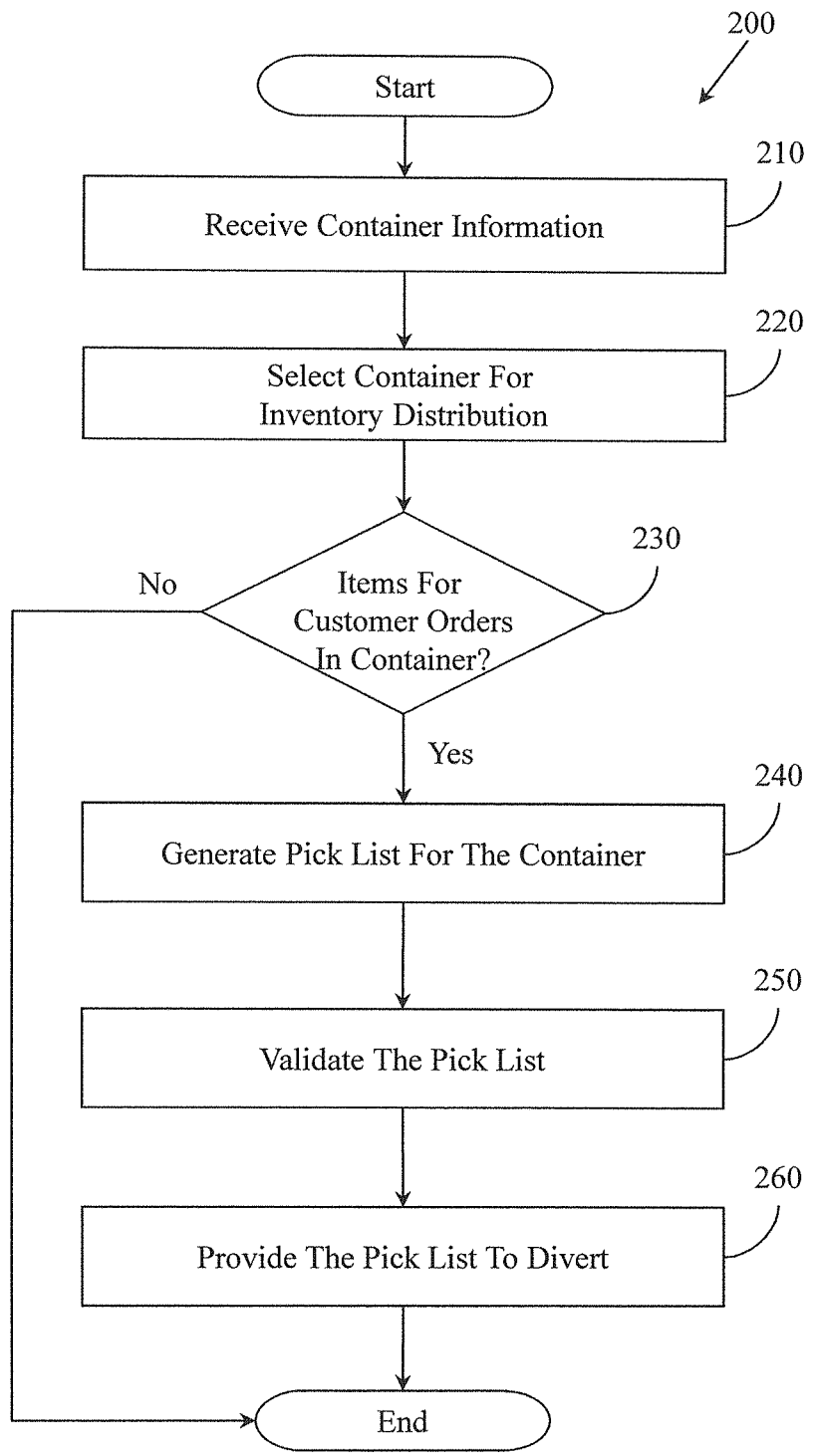
FIG. 2 illustrates one embodiment of a method associated with identifying items from a delivery container for fulfilling customer orders.

Further aspects of picking items for customer orders on a per container basis will be discussed in relation to FIG. 2. FIG. 2 illustrates method 200 that is associated with identifying items for customer orders from a container and generating pick lists to cause the items to be set aside for associated customer orders. In one embodiment, method 200 is implemented and performed by the computing device 140 and the inventory management system 100 of FIG. 1. Of course, it should be appreciated that method 200 is not limited to operating within the computing device 140 but is discussed as being implemented within the computing device 140 simply for purposes of explanation.

At 210, container information is received. In one embodiment, the container information is received by the computing device 140 when the container is delivered. Accordingly, the container information may be obtained when a barcode or other code is electronically scanned to initiate a transfer of the container information to the computing device 140, when the container is shipped, and so on. Receiving the container information may include receiving an electronic computer communication, identifying the electronic computer communication as the container information and storing the electronic computer communication in an electronic memory or database. In one embodiment, the container information is a data structure that includes attributes related to the container and items provided in the container. Furthermore, the container information may be stored in an electronic database (e.g., order database 130) for later retrieval and use.

At 220, the container is selected for unpacking and/or distribution to inventory of the retail store. In one embodiment, selecting the container includes electronically scanning and receiving an identifier of the container that correlates with the container information from block 210. In this way, the container information can be retrieved from, for example, the order database 130 for analysis at block 230. Additionally, while blocks 210 and 220 are discussed separately, in one embodiment, the blocks 210 and 220 may occur in parallel. That is, the container information may be received when the container is selected for distribution/unpacking or in response to the container being selected for unpacking.

At 230, items for customer orders are identified in the container. In one embodiment, whether items for customer orders are in the container is determined according to information associated with the container. For example, depending on a specific implementation, the presence of reserved or matched items for customer orders may be determined in two separate ways.

The first way to identify whether items for customer orders are in the container is by identifying if specifically reserved items are present. The reserved items are items specifically placed in the container in response to the warehouse being notified of one or more customer orders for the reserved items that, for example, cannot be fulfilled from a current inventory of the retail store. In general, the reserved items are reserved in that they are specifically assigned to one or more customer orders.

In general, the presence of reserved items may be indicated in several different ways. For example, an indicator flag (e.g., bit value or particular field value associated with the container information) may be present to indicate reserved items are in the container. In one embodiment, the indicator flag may cause a further inquiry that generates an itemization of the reserved items. Furthermore, in one embodiment, packing lists or another item listing for the container are compared to customer orders to determine if the reserved items are present. In another embodiment, the attributes of the container indicate which items in the container are reserved items and so on.

The second way to identify the presence of items for customer orders is to identify whether the container includes any items that correlate with presently outstanding customer orders. That is, the container may or may not include any specifically reserved items as packed by the warehouse. However, in one embodiment, if general inventory items included in the container correlate with items for presently outstanding customer orders, then the items may be matched with items on customer orders for purposes of generating a pick list for the particular container.

Accordingly, in one embodiment, the computing device 140 compares items for outstanding customer orders against a list of general inventory items in the container. If items between the list and items specified by the customer orders match, then the items are specified as matching items and are "reserved" from being distributed into the general inventory of the retail store. In this way, items can be directly diverted from the container to outstanding customer orders to facilitate efficiently fulfilling those customer orders.

However, if no items for customer orders are identified in the container, at 230, then method 200 ends. If items for customer orders are identified, then processing of the container proceeds to 240.

At 240, a pick list is electronically generated for the container. In one embodiment, the pick list is electronically generated for items identified at block 230. The pick list may include item identifiers, quantities, customer order identifiers and other information that is helpful for identifying the items for customer orders (e.g., reserved items) and directing those items to an appropriate location for fulfillment of the customer orders without being placed in a general inventory of the retail store. In general, the pick list may include different information depending on a particular implementation. Accordingly, the pick list may be arranged according to customer orders or simply by a list of ordered items to be set aside.

At 250, the pick list is electronically validated. In one embodiment, validating the pick list includes ensuring that customer orders for the identified reserved/matched items have not already been fulfilled. For example, the computing device 140 may query the order database for a status (e.g., fulfilled, shipped, cancelled, partially picked, etc.) of each customer order associated with an identified reserved/matched item from the container. If the status indicates that the reserved/matched items are still needed to fulfill the customer orders, then the pick list is validated. However, if one or more status identifiers do not correlate, then an associated item may be merged into the general inventory.

At 260, the pick list is electronically provided. In one embodiment, the computing device 140 electronically generates and renders the pick list 150 on a display screen for a user to view when unpacking the container. In general, the pick list is electronically provided to the user to streamline unpacking the container. Thus, in various implementations, the pick list may be provided on a handheld electronic scanner or other electronic device for quick access and viewing while unpacking the container. In this way, the pick list is generated and provided to divert items for customer orders from being stocked into the general inventory of the retail store.

Computing Device Embodiment

Figure 3:
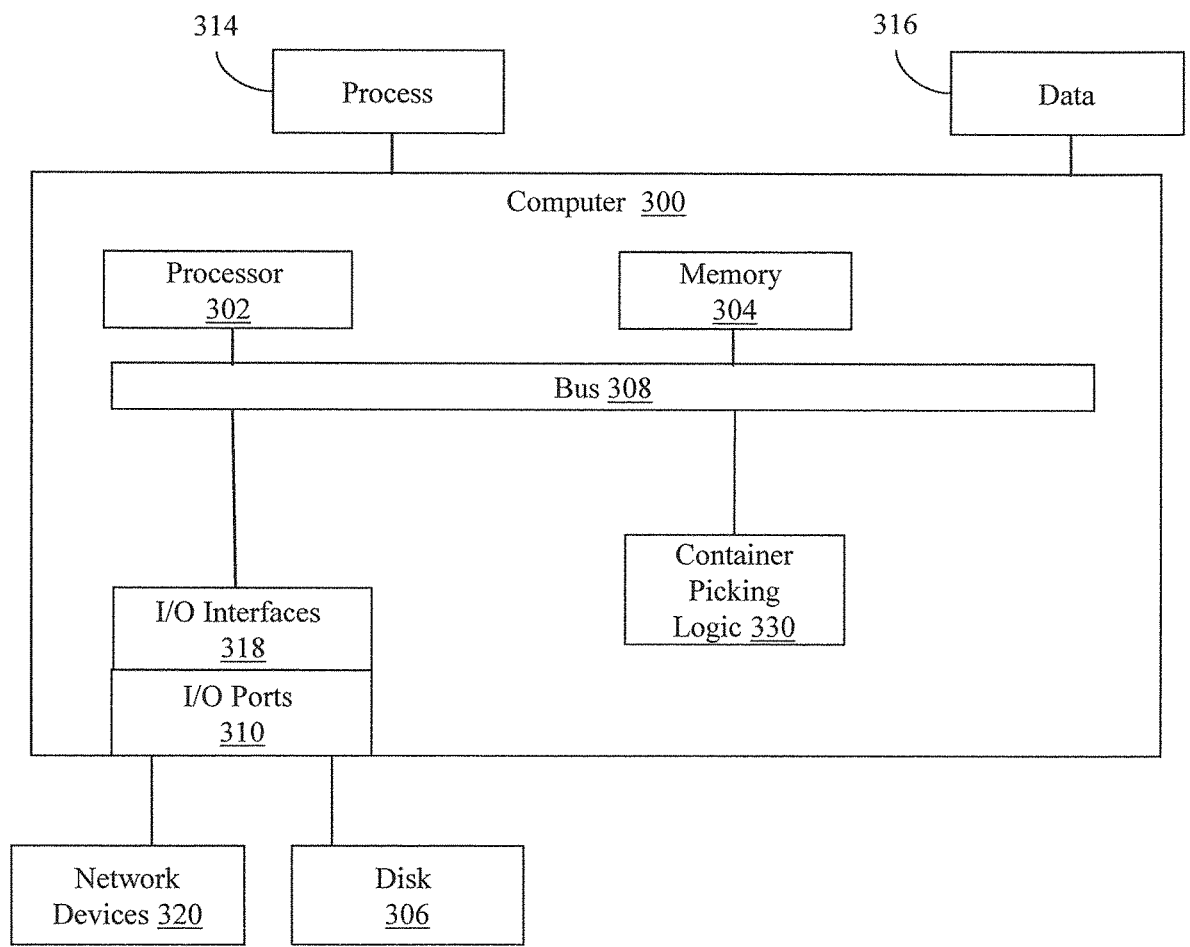
FIG. 3 illustrates an embodiment of a computing system configured with the example systems and methods disclosed.

FIG. 3 illustrates an example computing device that is configured and/or programmed with one or more of the example systems and methods described herein, and/or equivalents. The example computing device may be a computer 300 that includes a processor 302, a memory 304, and input/output ports 310 operably connected by a bus 308. In one example, the computer 300 may include container picking logic 330 configured to facilitate identifying items for customer orders in containers and generating pick lists on a per container basis similar to the inventory management system 100 with the order logic 110 and the list logic 120 shown in FIG. 1. In different examples, the container picking logic 330 may be implemented in hardware, a non-transitory computer-readable medium with stored instructions, firmware, and/or combinations thereof. While the container picking logic 330 is illustrated as a hardware component attached to the bus 308, it is to be appreciated that in other embodiments, the container picking logic 330 could be implemented in the processor 302, stored in memory 304, or stored in disk 306.

In one embodiment, container picking logic 330 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform the method 200 of FIG. 2. The means may also be implemented as stored computer executable instructions that are presented to computer 300 as data 316 that are temporarily stored in memory 304 and then executed by processor 302.

The container picking logic 330 may also provide means (e.g., hardware, non-transitory computer-readable medium that stores executable instructions, firmware) for identifying ordered items from electronic information associated with a container and causing an electronic pick list to be generated according to the identified ordered items.

Generally describing an example configuration of the computer 300, the processor 302 may be a variety of various processors including dual microprocessor and other multi-processor architectures. A memory 304 may include volatile memory and/or non-volatile memory. Non-volatile memory may include, for example, ROM, PROM, and so on. Volatile memory may include, for example, RAM, SRAM, DRAM, and so on.

A storage disk 306 may be operably connected to the computer 300 via, for example, an input/output interface (e.g., card, device) 318 and an input/output port 310. The disk 306 may be, for example, a magnetic disk drive, a solid state disk drive, a floppy disk drive, a tape drive, a Zip drive, a flash memory card, a memory stick, and so on. Furthermore, the disk 306 may be a CD-ROM drive, a CD-R drive, a CD-RW drive, a DVD ROM, and so on. The memory 304 can store a process 314 and/or a data 316, for example. The disk 306 and/or the memory 304 can store an operating system that controls and allocates resources of the computer 300.

The computer 300 may interact with input/output devices via the i/o interfaces 318 and the input/output ports 310. Input/output devices may be, for example, a keyboard, a microphone, a pointing and selection device, cameras, video cards, displays, the disk 306, the network devices 320, and so on. The input/output ports 310 may include, for example, serial ports, parallel ports, and USB ports.

The computer 300 can operate in a network environment and thus may be connected to the network devices 320 via the i/o interfaces 318, and/or the i/o ports 310 to send and/or receive computer communications. Through the network devices 320, the computer 300 may interact with a network. Through the network, the computer 300 may be logically connected to remote computers. Networks with which the computer 300 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer communication," as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium" or "computer storage medium," as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User," as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a computer including at least a processor cause the computer to perform actions, the instructions comprising instructions configured for:

creating a data structure comprising container attributes for a container loaded with a plurality of items for a retail store;

receiving identifying information of the container in response to the container being received at the retail store;

retrieving, by the processor accessing a memory, the container attributes based upon the identifying information;

identifying, using the container attributes, from the plurality of items loaded in the container: i) one or more reserved items for fulfilling at least one customer order of a plurality of customer orders and ii) one or more general inventory items for an inventory of the retail store, wherein the one or more reserved items are separated in the identifying from the one or more general inventory items;

in response to identifying one or more reserved items from the container attributes, generating an indicator flag for the container to indicate reserved items are present in the container;

in response to identifying the one or more reserved items for fulfilling at least one customer order of a plurality of customer orders and the one or more general inventory items:

generating a pick list for the container to control a separation of the one or more reserved items from the one or more general inventory items, wherein the pick list identifies the reserved items in the container and the at least one customer order to indicate that the reserved items are allocated for fulfilling the at least one customer order;

validating the pick list by determining whether the at least one customer order has been fulfilled using items from a different container in place of the one or more reserved items in the container;

wherein the validating includes querying an order database for a status of one or more customer orders associated with an identified reserved item from the container;

in response to the status indicating that the reserved items are still needed for a selected customer order, indicating the pick list as validated; and in response to the status for a selected reserved item does not correlate to a customer order, causing the selected reserved item to be merged into the general inventory.

2. The non-transitory computer-readable medium of claim 1,
wherein identifying the one or more reserved items by i) determining whether the one or more general inventory items can be used to fulfill one or more of the plurality of customer orders and ii) determining whether the plurality of items include the one or more reserved items,
wherein the plurality of items are delivered from a warehouse for the inventory of the retail store and wherein the reserved items are items included in the container by the warehouse for fulfilling one or more of the plurality of customer orders.

3. The non-transitory computer-readable medium of claim 1, wherein the container attributes include shipping information, container information, item information, and customer order information for the one or more reserved items included in the container to fulfill the at least one customer order.

4. The non-transitory computer-readable medium of claim 1,
wherein identifying whether the plurality of items loaded in the container include the one or more reserved items includes comparing the plurality of customer orders to the plurality of items in the container to determine whether one or more of the plurality of customer orders can be fulfilled from the plurality of items in the container.

5. The non-transitory computer-readable medium of claim 1, further comprising instructions configured for:
electronically providing the pick list to a display screen of an electronic device to cause the reserved items to be diverted from being distributed to the inventory of the retail store.

6. The non-transitory computer-readable medium of claim 1,
wherein creating the data structure comprises setting a bit value of a specified field within the container attributes to a specified value when the container is loaded with the one or more reserved items.

7. A computing system, comprising:
at least one processor;
at least one memory operably connected to the at least one processor;
a non-transitory computer-readable medium storing computer-executable instructions that when executed by the at least one processor cause the at least one processor to:
receive a data structure comprising container attributes for a container loaded with a plurality of items for a retail store;
receive identifying information of the container in response to the container being received at the retail store;
retrieve the container attributes based upon the identifying information; and
identify, using the container attributes, from the plurality of items loaded in the container: i) one or more reserved items for fulfilling at least one customer order of a plurality of customer orders and ii) one or more general inventory items for an inventory of the retail store;
in response to identifying one or more reserved items from the container attributes, generate an indicator flag for the container to indicate reserved items are present in the container;
generate a pick list for the container to control a separation of the one or more reserved items from the one or more general inventory items, wherein the pick list identifies the one or more reserved items identified in the container separate from the one or more general inventory items, wherein the pick list correlates the reserved items in the container with the at least one customer order to indicate that the reserved items are to be allocated for fulfilling the at least one customer order;
validate the pick list by determining whether the at least one customer order has been fulfilled using items from a different container in place of the one or more reserved items in the container;
wherein the validating includes querying an order database for a status of one or more customer orders associated with an identified reserved item from the container;
in response to the status indicating that the reserved items are still needed for a selected customer order, indicate the pick list as validated; and
in response to the status for a selected reserved item does not correlate to a customer order, cause the selected reserved item to be merged into the general inventory.

8. The computing system of claim 7,
wherein the computer-executable instructions are further configured to cause the at least one processor to identify the one or more reserved items by i) determining whether the one or more general inventory items can be used to fulfill one or more of the plurality of customer orders and ii) determining whether the plurality of items include the one or more reserved items,
wherein the plurality of items are delivered from a warehouse for the inventory of the retail store and wherein the reserved items are items included in the container by the warehouse for fulfilling one or more of the plurality of customer orders.

9. The computing system of claim 7, wherein the computer-executable instructions are further configured to cause the at least one processor to validate the pick list by determining whether the at least one customer order has been fulfilled using items from a separate container in place of the one or more reserved items in the container.

10. The computing system of claim 7, wherein the container attributes include shipping information, container information, item information, and customer order information for the one or more reserved items included in the container to fulfill the at least one customer order.

11. The computing system of claim 7,
wherein the computer-executable instructions are further configured to cause the at least one processor to identify whether the plurality of items loaded in the container include the one or more reserved items by comparing the plurality of customer orders to the plurality of items in the container to determine whether one or more of the plurality of customer orders can be fulfilled from the plurality of items in the container.

12. The computing system of claim 7, wherein the computer-executable instructions are further configured to cause the at least one processor to electronically provide the pick list to cause the reserved items to be diverted from being distributed to the inventory of the retail store.

13. The computing system of claim 7,
wherein the computer-executable instructions are further configured to cause the at least one processor to retrieve item information for the plurality of customer orders from an electronic order database, and wherein the inventory is in-store stock of the retail store.

14. A computer-implemented method, the method comprising:

creating a data structure comprising container attributes for a container loaded with a plurality of items for a retail store;

receiving identifying information of the container in response to the container being received at the retail store;

retrieving the container attributes based upon the identifying information;

identifying, using the container attributes, from the plurality of items loaded in the container: i) one or more reserved items for fulfilling at least one customer order of a plurality of customer orders and ii) one or more general inventory items for an inventory of the retail store;

in response to identifying one or more reserved items from the container attributes, generating an indicator flag for the container to indicate reserved items are present in the container;

in response to identifying the one or more reserved items for fulfilling at least one customer order of a plurality of customer orders and the one or more general inventory items:

generating an electronic pick list for the container to control a separation of the one or more reserved items from the one or more general inventory items, wherein the electronic pick list identifies the reserved items in the container and the at least one customer order to indicate that the reserved items are allocated for fulfilling the at least one customer order;

validating the pick list by determining whether the at least one customer order has been fulfilled using items from a different container in place of the one or more reserved items in the container;

wherein the validating includes querying an order database for a status of one or more customer orders associated with an identified reserved item from the container;

in response to the status indicating that the reserved items are still needed for a selected customer order, indicating the pick list as validated; and in response to the status for a selected reserved item does not correlate to a customer order, causing the selected reserved item to be merged into the general inventory.

15. The computer-implemented method of claim 14, wherein the container attributes include a list of the plurality of items in the container and the indicator flag that denotes whether the container includes the one or more reserved items.

16. The computer-implemented method of claim 14, further comprising:

wherein the container attributes include customer order information for items included in the container to fulfill the at least one customer order; and wherein identifying whether plurality of items loaded in the container include the one or more reserved items includes comparing the customer order information plurality of items in the container to determine whether one or more of the plurality of customer orders can be fulfilled from the plurality of items in the container.

17. The computer-implemented method of claim 14, further comprising:

electronically providing the electronic pick list to cause the reserved items to be diverted from being distributed to the inventory of the retail store, wherein generating the electronic pick list includes generating an electronic document that includes information about the reserved items and associated customer orders, and wherein electronically providing the electronic pick list includes rendering the electronic document on a display.

18. The computer-implemented method of claim 14, further comprising:

validating the electronic pick list according to the status of the at least one customer orders associated with the one or more reserved items.

19. The computer-implemented method of claim 14, further comprising:

when the container includes the one or more reserved items for fulfilling at least one customer order of a plurality of customer orders and the one or more general inventory items are items for an inventory of the retail store:

generating an electronic alert to indicate that the container includes the one or more reserved items for fulfilling at least one customer order of a plurality of customer orders.

* * * * *